March 17, 1931.　　　J. E. ENGLISH　　　1,796,985
POWER TRANSMISSION DEVICE
Filed Dec. 21, 1929　　　4 Sheets-Sheet 1
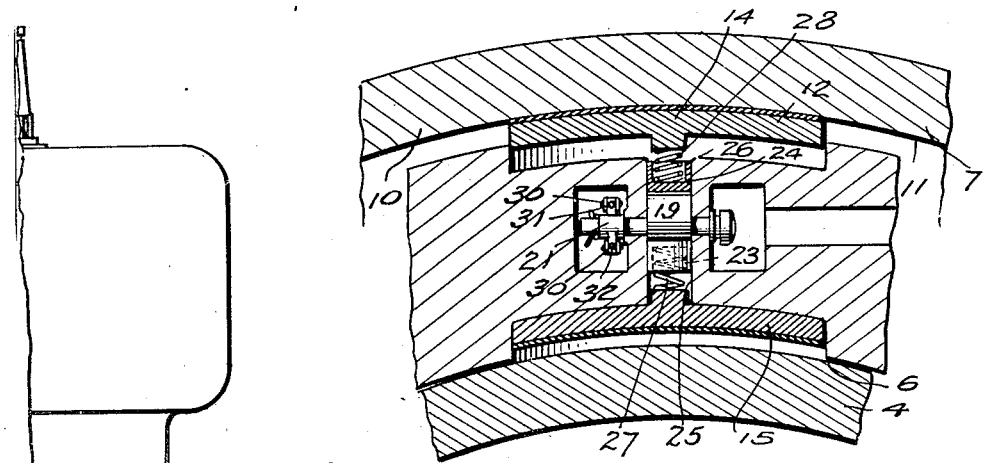
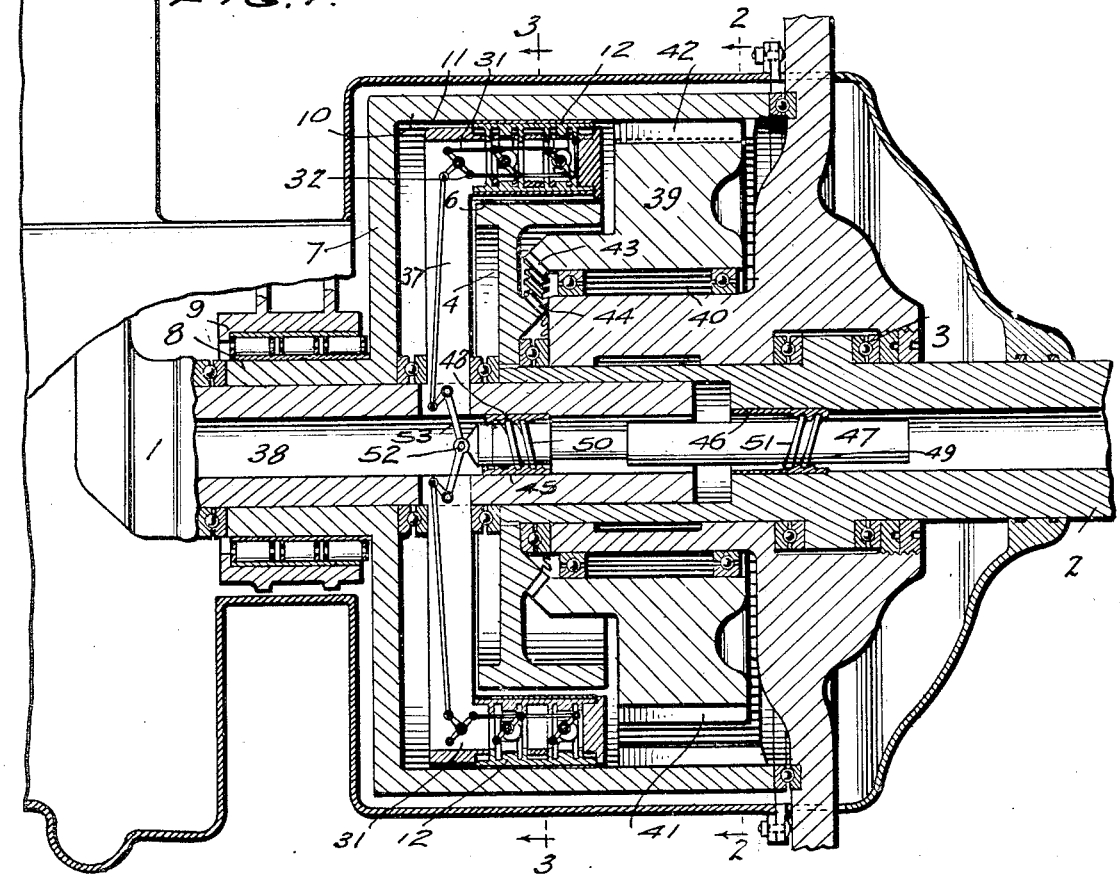
INVENTOR
JOSEPH E. ENGLISH
BY Robert H. Young
ATTORNEY March 17, 1931.   J. E. ENGLISH   1,796,985
POWER TRANSMISSION DEVICE
Filed Dec. 21, 1929   4 Sheets-Sheet 2

INVENTOR
JOSEPH E. ENGLISH
BY Robert H. Young
ATTORNEY

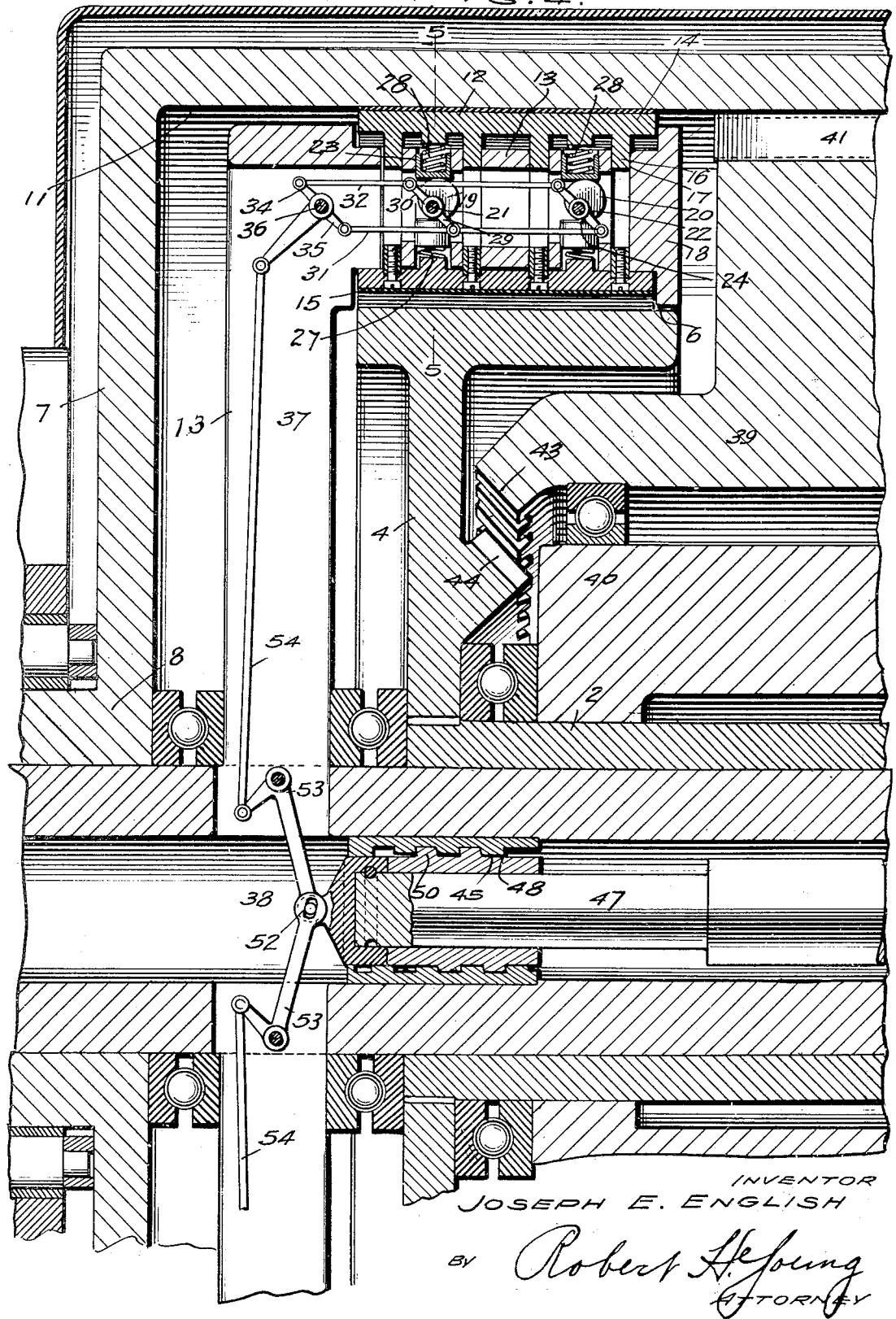

March 17, 1931. J. E. ENGLISH 1,796,985
POWER TRANSMISSION DEVICE
Filed Dec. 21, 1929    4 Sheets-Sheet 4

INVENTOR
JOSEPH E. ENGLISH
BY Robert H. Young
ATTORNEY

Patented Mar. 17, 1931

1,796,985

UNITED STATES PATENT OFFICE

JOSEPH E. ENGLISH, OF LANGLEY FIELD, VIRGINIA

POWER TRANSMISSION DEVICE

Application filed December 21, 1929. Serial No. 415,799.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The invention relates to power transmission devices such as are used in automobiles, motorboats, stationary engines, and other machines to permit variation of the rotational speed ratio of driving and driven shafts.

The principal object in view is to provide a transmission device suitable for use in aircraft propulsion. There is great need for variable speed transmission between motor and propeller, but the requirements are so exacting that it has heretofore seemed a hopeless problem to devise a satisfactory device for the purpose.

The usual direct drive in aircraft propulsion is efficient in taking off and in climbing, i. e. when the motor is operating under full load conditions. In level flight and in diving, the propeller speed for efficient performance is greater than the economical crankshaft speed. In a dive, the practical result is over-running of the motor by the propeller. Normal conditions are reversed and the propeller impels the motor at increased speed. Horsepower is wasted. The motor tends to retard the propeller below efficient speed. There is excessive wear and tear on the motor. Fuel consumption is increased. In flight at high altitudes these disadvantages of direct drive are aggravated, due to the rarified air encountered.

Heretofore, aeronautical engineers have directed their efforts toward variable pitch propellers in attempting to produce the desired propeller efficiency with direct drive. Propellers of this type are objectionable in so many respects that a suitable variable speed transmission would be far more desirable.

It is the purpose of the present invention, therefore, to afford a transmission which is adapted for use in aircraft to make direct connection between motor and propeller during appropriate flight conditions and to change the ratio of propeller speed to motor speed when required.

A further object is to provide a transmission device capable of automatic shifting to meet relative changes in torque of driving and driven shafts. This feature is especially desirable for aircraft propulsion because an aircraft pilot already has about as many controls as can conveniently be handled. In flying, the torque changes occur so frequently that an automatic transmission is almost a practical necessity.

A still further object is the provision of a transmission for use in movable craft such as automobiles, aircraft and boats, which permits changing speed without the usual enormous power losses. In automobiles, for instance, use of this transmission will permit substitution of a highly efficient worm-gear drive for the usual spider-gear and pinion differential drive.

Other objects and advantages of the proposed transmission over known devices of this nature will appear as the following specification is read in connection with the accompanying drawings, in which:

Figure 1 is a vertical section of the device on an axial plane, showing the same applied to a motor with the clutch set for gearing up the driven shaft;

Figure 4 is an enlarged, fragmentary sectional view similar to Figure 1, showing a clutch element and operating mechanism therefor in greater detail;

Figure 5 is a transverse, fragmentary section of the clutch element on line 5—5 of Figure 4.

Figure 2:
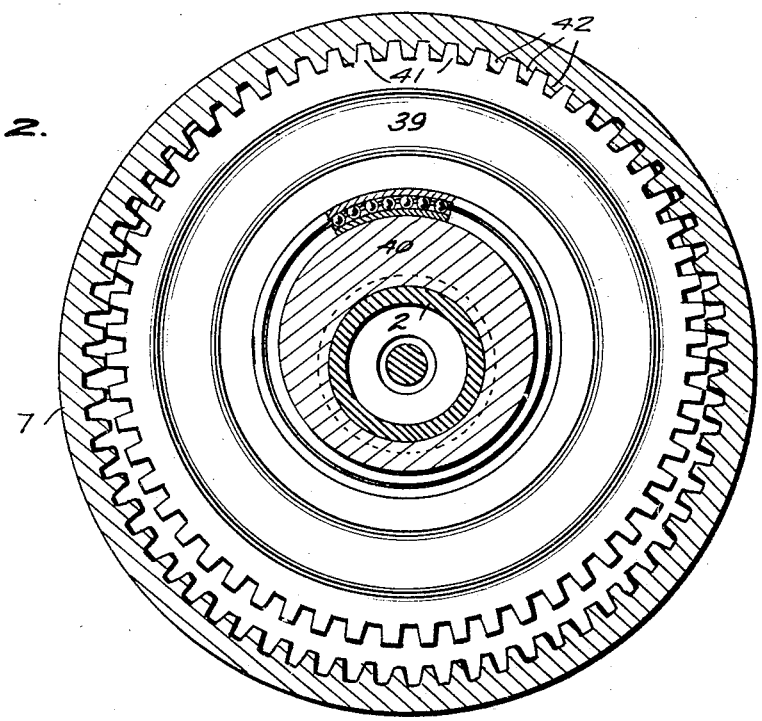
Figure 2 is a transverse vertical section on line 2—2 of Figure 1.
Figure 3:
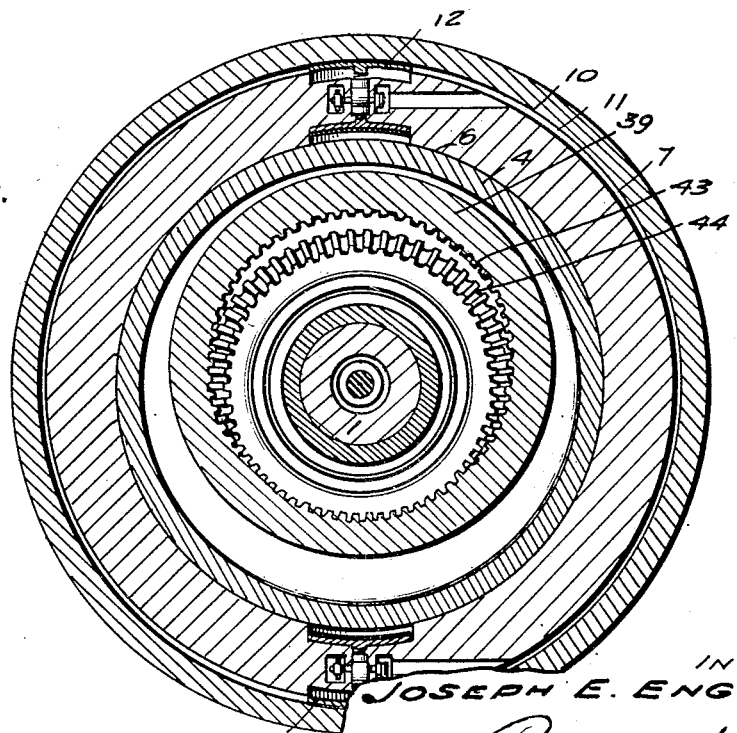
Figure 3 is a similar view on line 3—3 of Figure 1.

The drawings disclose a transmission for aircraft motor constructed in accordance with the invention.

The numeral 1 designates the crankshaft of the motor, which may be termed the "driving element" in its relation to the transmission mechanism. 2 designates the propeller shaft, which is the "driven element" of the combination. The broad terms "driving element" and "driven element" will be used hereinafter to mean the corresponding elements of any machinery which may be susceptible of being coupled together by the transmission drive.

The driven element is preferably journaled in bearing 3 in axial alignment with the driving element. To assist in maintaining rigid alignment of the two elements, their adjoining ends may be fitted together in the manner shown with the end of one journaled in a recess in the other.

A friction clutch is provided for the purpose of driving the driven element direct from the driving element at the same speed. This clutch is preferably of the brake-shoe and drum type. Some other type of clutch might be substituted, but the selected type lends itself to compactness and strength of construction.

Two drums are required. For convenience of description one drum will be termed the "low speed clutch member" and the other the "high speed clutch member." In the constructional embodiment shown the low speed member 4 is integral with the driven element and has a cylindrical drive portion affording an external frictional surface 6. The high speed member 7 is much larger than the low speed member and incloses the latter. Member 7 has a reduced bearing portion 8 journaled in bearing 9 of the motor crankcase. Bearing portion 8 fits rotatably on the driving element 1 and forms a bearing for the same. The enlarged main portion 10 of member 7 is cylindrical in form and has an inner frictional surface 11 opposed to the external frictional surface 6 of low speed member 4 and spaced therefrom to an extent sufficient to accommodate adjustable friction shoes 12 carried by a supporting disk 13 mounted fixedly on the driving element 1. Shoes 12 should be diametrically opposed to afford a balanced construction.

Each adjustable shoe is thus interposed between the two frictional surfaces. It is intended that the shoe shall be capable of interchangeable contact with the two surfaces, in order that either clutch member may be connected for rotation with the driving element. For this purpose, each shoe is double-faced. The outer facing 14 and the inner facing 15 are adapted to contact alternately with the frictional surfaces of the high speed and low speed clutch members respectively.

The details of construction of each clutch-shoe are shown most clearly in enlarged Figures 4 and 5. It will be noted that both facings are connected together as a unit by a plurality of relatively spaced frame members 16 which are slidable radially with respect to the disc 13 in bearing slots 17 formed in the axially projecting flange 18 which extends from the peripheral portion of disc 13 into the space between the high and low speed clutch members. Frame members 16 are cut away centrally to provide an axial channel for reception of operating mechanism for the shoe.

The shoe operating mechanism which is shown in Figures 4 and 5 includes two cams 19 and 20, which are fixedly mounted on rock shafts 21 and 22 respectively journaled in flange 18. Inner and outer followers 23 and 24 are diametrically opposed to each other for contact with opposite faces of each cam and are mounted in guides 25 and 26 extending radially with respect to supporting disc 13. Compression springs 27 and 28 are interposed between the followers and their corresponding shoe facings. These springs maintain the followers in proper frictional contact with the cams at all times. Each rock shaft has diametrically opposed crank arms 29 and 30 which are connected by means of connecting rods 31 and 32 with arms 33 and 34 of a double bell crank lever 35 which is fulcrumed at 36 in the outer end of a radial slot 37 extending inwardly from the flange 18 to the central recess 38 in the driving element.

Further description of the clutch-shoe operating mechanism will be postponed until a more appropriate place in the specification. In the meantime, gearing for the high speed clutch member will be described.

The ring gear 39 is mounted for rotation within the high speed clutch member 7 on a bearing 40 provided on bearing member 3. The axis of the bearing for gear 39 is eccentric to the common axis of the driving and driven members. Gear 39 has external teeth 41 meshing with internal teeth 42 on the drum portion of the high speed clutch member 7. Gear 39 also has internal gear teeth 43 meshing with gear teeth 44 on the low speed clutch member 4. For convenience the latter set of gear teeth are beveled. The gear ratios should be such as to produce the desired ratio between driving and driven elements when the high speed clutch adjustment is in operation.

Gear teeth 41 and 43 are concentrically disposed around an axis displaced radially from the common axis of the driving and driven elements, whereas gear teeth 42 and 44 are concentric to the last-mentioned common axis.

Automatic means for shifting the clutch shoes to meet the varying power conditions have been devised. It may be desirable to have means for manual control. The automatic control being preferred, it has been incorporated in the construction illustrated in Figures 1 and 4 and will be described first.

The principal parts of the automatic shifting device are two torque weights 45 and 46 and a thrust rod 47, all of which are contained within registering central bores in the meeting ends of the driving and driven elements.

Each torque weight is in the form of a sleeve provided with an internal worm gear and is frictionally engaged with the bore in which it is mounted. The gears of both torque weights are oppositely threaded and differ in pitch. These gears are adapted to mesh with corresponding external worm gears provided on thrust rod 47 in suitably spaced relation to each other. The internal worm gears of torque weights 45 and 46 are designated by the numerals 48 and 49, respectively, and the corresponding external gears on thrust rod 47 by the numerals 50 and 51, respectively. The arrangement of worm gears is such that thrust will be imparted to the rod 47 in opposite direction when the driving and the driven elements rotate at different speeds. The pitch of the worm gear of torque weight 45 is greater than that of the worm gear of torque weight 46.

The end of thrust rod 47 adjacent to the disc 13 is connected by means of a universal joint 52 with bell crank levers 53 connected in turn by connecting rods 54 with the double bell crank levers 35.

The operation of the power transmission device with the automatic control will not be described. Assuming that the transmission is used in connection with an aircraft motor and that the motor is started, the driving element 1 will commence rotating before the driven element 2. This will be true regardless of the position of the clutch shoes, because they will slip with respect to either clutch member 4 or 7 with which they may happen to be in contact at the time. As a result, torque weight 45 will impart thrust to rod 47 toward the left in Figure 1. The clutch shoes will be forced into contact with the low speed clutch member 4 and will cause the driven element 2 to rotate in the same direction as the driving element and at the same speed. While this power condition exists, the thrust rod, the torque weights, and the driving and driven elements will be relatively immovable, but the thrust rod will continue to hold the clutch shoes in firm, operative contact with the low-speed clutch member. Throughout the operations of warming up the motor, taxying on the ground, taking off, and climbing, there will be no change in the operative condition of the transmission mechanism, because the propeller will be under full load conditions.

When the aircraft is levelled off for cruising flight, the propeller will not be under full load and may tend to overrun the motor. This tendency is desired and should be induced, if it does not occur naturally. This may be accomplished by throttling the motor down a little, or by diving gently and also throttling the motor. When the speed of the driven element exceeds that of the driving element, torque weight 46 will impart thrust toward the right in Figure 1 in excess of and overcoming the thrust imparted by torque weight 45. The clutch shoes will be shifted into contact with the high speed clutch member 7, thereby throwing the driven element into positive gear connection with the driving element so that the propeller will be driven at the desired higher and more efficient speed by the motor. This power condition is desirable for level flight and diving.

Upon changing from the flight conditions just mentioned to climbing in which the propeller is again placed under full load, the sudden increase in load on the driven element will cause the clutch shoes to slip with respect to the high speed clutch member. The torque weight 45 will then overcome the influence of torque weight 46 and will cause the clutch shoes to shift back to the low speed clutch member.

Figure 6:
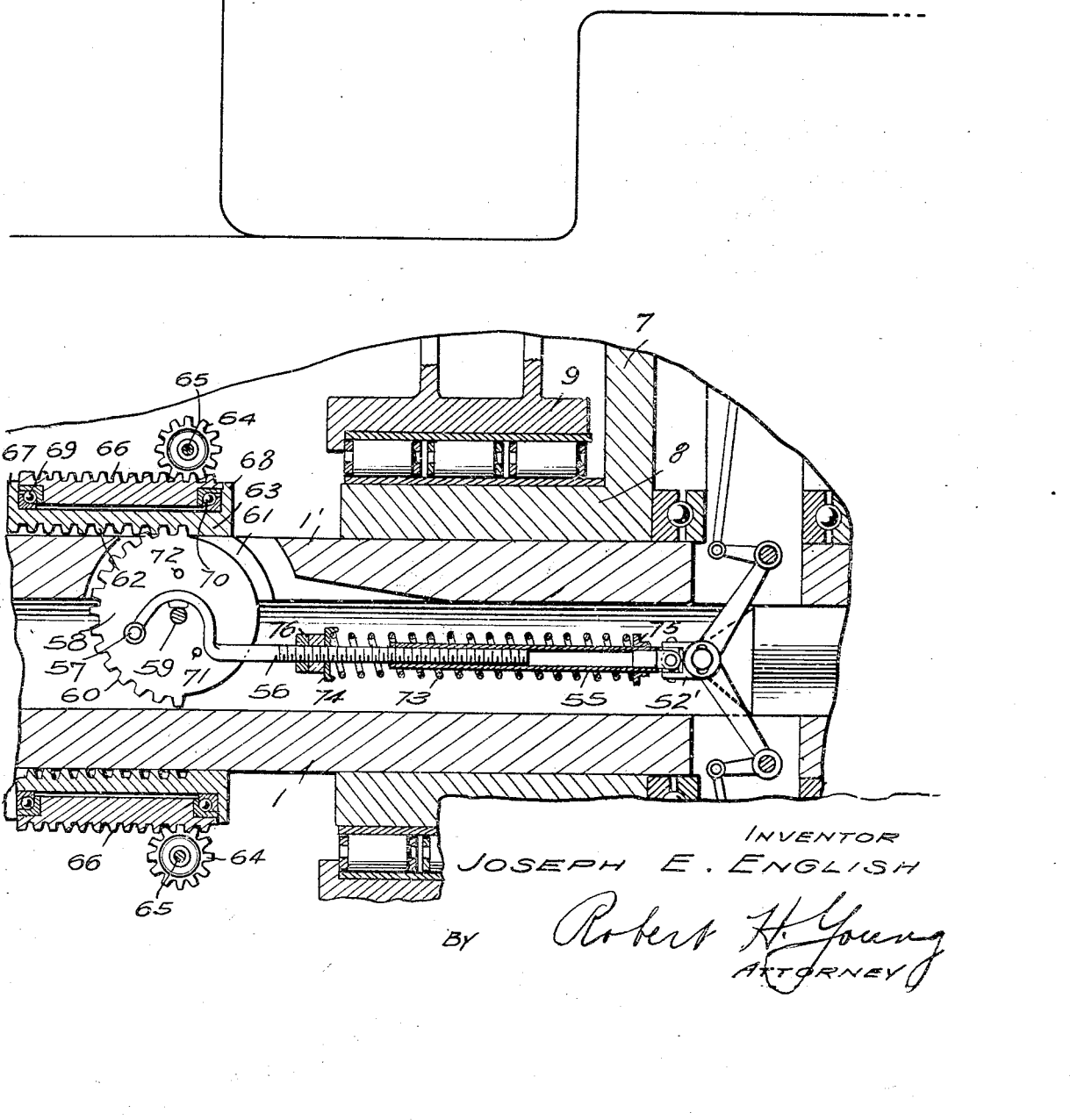
Figure 6 is a fragmentary section similar to Figure 4 showing manual clutch shifting mechanism added to the automatic device.

The manual control is shown in Figure 6. In this instance, two telescopic members 55 and 56 are positioned within the bore of the driving element 1'. Member 55 is connected with the universal joint 52' of the operating mechanism for the clutch shoes (not shown). Member 56 is connected with a crank pin 57 on a pinion gear 58 pivoted in the driving element on a tangential axis 59. The teeth 60 of this gear work through a slot 61 in the driving element and protrude therefrom for engagement with the circular teeth 62 of a rack member 63. The rack member is in the form of a sleeve rotatably and slidably mounted on the driving element. The gear teeth of the rack and pinion should be of such construction that the pinion teeth will be free for rotation with the driving element without excessive frictional contact with the rack teeth. Rotation of the pinion about its axis will, on the other hand, be caused by reciprocation of the rack member along the driving element. Convenient means for causing such reciprocation have been provided. For this purpose, an exteriorly disposed operating pinion 64 is journaled on an axis 65 for engagement with a second rack member 66 having circular teeth similar to those of the rack member 63. The rack member 66 is in the form of a sleeve rotatably mounted with respect to, and surrounding, rack member 63. Shoulders 67 and 68 on rack member 63 prevent relative axial movement of the two rack members, and to reduce friction, suitable anti-friction bearings 69 and 70 are interposed between the ends of rack member 66 and the corresponding shoulders on the rack member 63. The operating pinion 64 may be connected with any suitable manipulating device (not shown).

Stops 71 and 72 are provided on the pinion 58 in suitable positions at opposite sides of member 56 to limit its radial displacement within the driving element. Members 55 and 56 form an extensible connecting rod for imparting motion from the pinion 58 to the universal joint 52'. Compression spring 73 is mounted on the telescopic members 55 and 56 and is interposed between stops 74 and 75 which are mounted on these members. This spring will exert the pressure on universal joint 52' necessary to maintain the clutch shoes in firm contact with the high speed clutch member under appropriate running conditions. An adjusting nut 76 is threaded on member 56 for use in adjusting the position of stop 74 and consequently the tension of spring 73. Stop 75 is fixedly mounted on member 55, whereas stop 74 is slidable.

The operation of the manual control should be obvious. When pinion 64 is rotated in the appropriate direction, rotary motion will be imparted to pinion 58 within the driving element and thrust will be transmitted to the universal joint of the clutch-operating mechanism.

Having thus described my invention what I claim is:

1. In a device of the class described, the combination with aligned rotatable driving and driven elements, of direct drive clutch member integral with one of said elements and including a cylindrical portion providing an external frictional surface, a second clutch member rotatably mounted upon the other element and having a cylindrical portion surrounding the direct drive clutch member and providing an interior frictional surface separated from the exterior frictional surface of the latter, means connecting the second clutch member with the first element for rotation at a different speed from that of the said element, a third clutch member integral with the element upon which the second clutch member is mounted, a movable shoe carried by the third clutch member and disposed between the frictional surfaces of the direct drive and second clutch members for alternate frictional contact with the said surfaces, and means for shifting the clutch shoe.

2. In a device of the class described, the combination with rotatable driving and driven elements, of a direct drive clutch member integral with one of the elements, a second clutch member geared to the said element for movement at a different speed from that of the said element, a third clutch member rotatable with the other element and movable into operative contact alternately with the direct drive and second clutch members, and means for shifting the third clutch member into either operative position comprising separate torque weights carried by the driving and driven elements in frictional contact therewith, and means connecting the torque weights with the third clutch member and adapted to be moved in opposite directions responsive to differential slipping of the torque weights with respect to their supporting elements.

3. In a device of the class described, the combination with rotatable driving and driven elements, of a direct drive clutch member integral with one of the elements, a second clutch member geared to the said element for movement at a different speed from that of the said element, a third clutch member movable with the other element and adapted to be shifted alternately into operative contact with the direct drive and second clutch members, and shifting means for the third clutch member comprising separate torque weights carried by the driving and driven elements in frictional contact therewith, screw threads of different pitch and opposite direction of helical winding provided on the torque weights, a thrust rod, similar screw threads provided on the thrust rod for engagement with the screw threads of the respective torque weights, and means for connecting the thrust rod operatively to the third clutch member for shifting movement responsive to thrust of the rod.

4. In a device of the class described, the combination with rotatable driving and driven elements, of means for transmitting power from the driving element to the driven element at a plurality of definite speed ratios, separate torque weights carried by the driving and driven elements in frictional contact therewith, and means responsive to differential slipping of the torque therewith, and means responsive to differential slipping of the torque weights with respect to their supporting elements for selectively changing the speed ratio of power transmission.

5. In a device of the class described, the combination with rotatable driving and driven elements disposed in actual alignment with each other and having registering, cylindrical bores, a torque weight mounted within the bore of each element and being in the form of a cylindrical sleeve fitting the bore for frictional contact therewith, internal screw threads provided in each torque weight and being of different pitch and direction of helical winding with respect to those of the other torque weight, a thrust rod mounted for reciprocation within the aligned bores and projecting through the torque weights, screw thread sections provided on the thrust rod and adapted to fit the threads of the respective torque weights, means for transmitting power from the driving element to the driven element at a plurality of definite speed ratios, and means responsive to thrust imparted to the thrust rod by the torque weights for selectively changing the speed ratio of power transmission.

6. In a device of the class described, the combination with rotatable driving and driven elements, of means for transmitting power from the driving element to the driven element at a plurality of definite speed ratios, one of said elements having an internal bore, and a radial aperture leading from the bore to the exterior of the element, a longitudinally movable connecting member disposed within the said bore, means responsive to movement of the connecting member for selectively changing the speed ratio of power transmission, a manipulating member disposed outside the said element, a toothed gear mounted within the bore of the said element for pivotal movement upon a tangential axis and being connected with the connecting member and disposed with its teeth projecting exteriorly from the element through the said aperture, a sleeve mounted exteriorly upon the said element for sliding and reciprocating movement, internal circular gear teeth provided upon the sleeve in mesh with the tooth of the gear, and means connecting the manipulating member with the sleeve for imparting longitudinal reciprocating movement to the latter.

7. In a power transmission device, the combination with rotatable driving and driven shafts, of a pair of relatively high and low speed clutch members connected with the drive shaft for rotating same at different speed ratios, a third clutch member fixedly mounted on the driving shaft and including movable clutch elements engageable alternately with the high and low speed clutch members for coupling the third clutch member therewith and shaft-carried torque-controlled means operatively connected with said movable clutch elements for moving same into engagement selectively with either the high or low speed clutch member upon occurrence of inversions in the torque ratio of one shaft to the other.

8. In a power transmission device, the combination with rotatable driving and driven shafts, of a low speed clutch drum fixedly mounted on the driven shaft and having annular gear teeth on one face concentric to the rotational axis of the driven shaft, a high speed clutch drum rotatably supported on the driving shaft and enclosing the said low speed clutch drum, said high speed clutch drum having annular gear teeth disposed adjacent the geared face of the low speed drum and concentric with the axis of the driven shaft, an eccentrically mounted ring gear revolvably supported on the driven shaft and within the said high speed clutch drum, said ring gear having two sets of teeth concentric with the rotational axis of the ring gear and meshing with the gear teeth of the low and high speed clutch drums respectively, a driving member fixedly mounted on the driving shaft between the said high and low speed drums and torque-controlled means for coupling said driving member alternately with the low and high speed clutch drums.

9. In a power transmission, the combination with rotatable driving and driven shafts, of variable ratio gearing between the shafts including high and low speed gears having relatively confronting frictional clutch surfaces, a clutch member fixedly mounted on one of the shafts and including movable friction shoes engageable with the said frictional clutch surfaces, and torque-controlled means for moving the said shoes into engagement with the said surfaces alternately upon occurrence of inversions in the torque ratio of one shaft to the other.

10. In a power transmission, the combination with driving and driven shafts, of variable ratio gearing between the said shafts, separate torque weights carried respectively by the driving and driven shafts for rotation therewith and being slidable longitudinally of their respective shafts, a thrust rod geared with each weight so that thrust will be imparted to the rod for shifting same longitudinally and alternately in opposite directions upon occurrence of inversions in the torque ratio of one shaft to the other, means responsive to the shifting of the thrust rod for selectively changing the speed ratio of power transmission, and means operatively connected with said thrust rod for manually controlling the shifting movement thereof.

In testimony whereof I affix my signature.

JOSEPH E. ENGLISH.